June 15, 1965 A. HOPENGARTEN ETAL 3,189,756
WAVEFORM GENERATOR
Filed Oct. 19, 1961 2 Sheets-Sheet 1
FIG. 1.
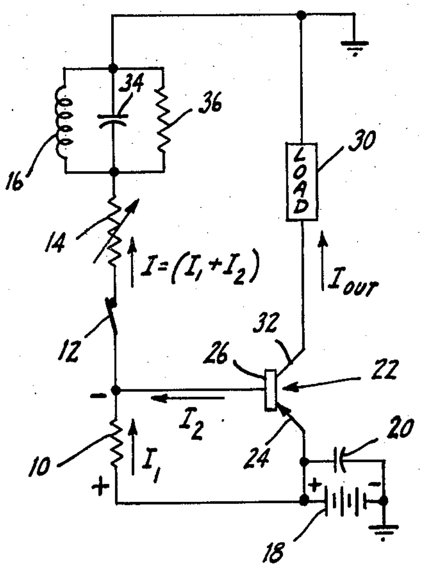
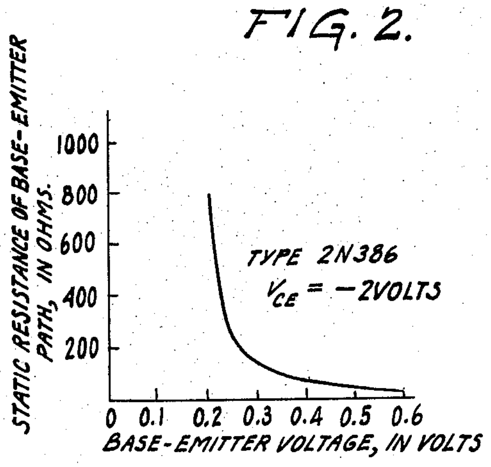
FIG. 3.
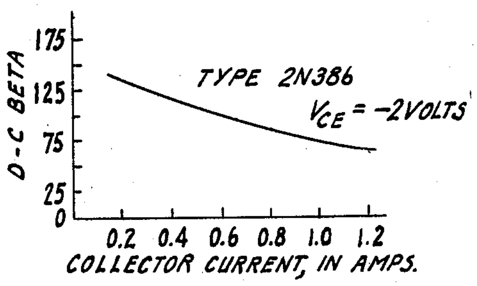
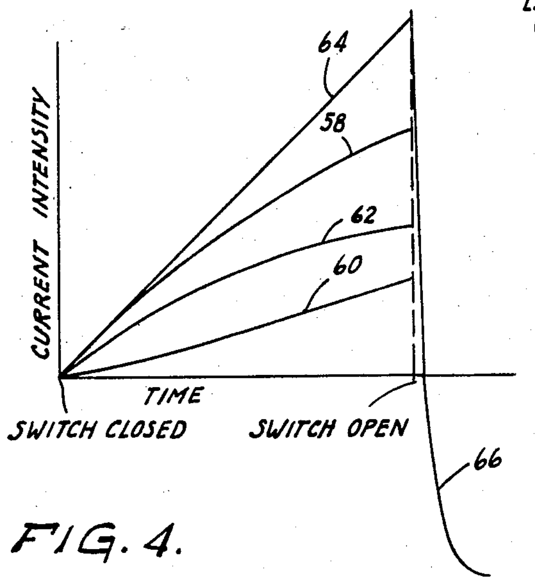
INVENTORS
ABRAM HOPENGARTEN
PAUL G. WOLFE
BY
Herbert Epstein
AGENT June 15, 1965 A. HOPENGARTEN ET AL 3,189,756

WAVEFORM GENERATOR

Filed Oct. 19, 1961 2 Sheets-Sheet 2

INVENTORS
ABRAM HOPENGARTEN
PAUL G. WOLFE
BY
Herbert Epstein
AGENT

United States Patent Office 3,189,756
Patented June 15, 1965

3,189,756

WAVEFORM GENERATOR

Abram Hopengarten, Lafayette Hill, and Paul G. Wolfe, Oreland, Pa., assignors, by mesne assignments, to Philco Corporation, Philadelphia, Pa., a corporation of Delaware Filed Oct. 19, 1961, Ser. No. 146,224
9 Claims. (Cl. 307—88.5)

This invention relates to a circuit for generating a time-varying electric current in a load. More particularly it relates to a transistor circuit for generating a sweep current in a deflection yoke of a television receiver.

To reduce the size, weight and power consumption of television receivers, transistor circuits have been substituted for vacuum-tube circuits in such receivers. The substituted transistor circuits frequently have been designed merely to perform the same functions heretofore performed by the corresponding vacuum-tube circuits. Thus a typical prior-art transistorized vertical sweep system of a television receiver, designed in imitation of a vacuum-tube sweep system, comprises a transistor oscillator which generates a periodically recurring sawtooth voltage, a transistor driver stage which converts this sawtooth voltage into a sawtooth current of low intensity and a transistor output stage which amplifies the driver output current to an intensity sufficient to cause deflection of the cathode ray beam of the picture tube across its entire screen when supplied to the vertical deflection yoke of the receiver.

Such transistorized substitutes for vacuum tube circuits often are unnecessarily complex because they fail to take advantage of the current-amplifying properties and non-linearities peculiar to transistors. For example the above-described sweep circuit requires three transistors rather than only two because one transistor is employed, unnecessarily, to generate a sawtooth voltage waveform which then must be converted by the succeeding transistor into a sawtooth current waveform. Moreover, because a transistor is not adapted to amplify linearly an amplitude-varying voltage, various distortions are introduced into the output current waveform by the non-linearities inherent in the transistor driver stage which converts the sawtooth voltage into a sawtooth current. To eliminate these distortions, relatively complex feedback and waveshaping networks have been employed heretofore. All this complexity causes the transistor circuit to be expensive and relatively susceptible to component failures, and to require an unnecessarily large amount of power for operation.

Accordingly an object of the invention is to provide an improved transistor circuit for generating time-varying currents.

Another object is to provide such a transistor circuit, which utilizes advantageously both the current-amplifying properties and non-linearity of a transistor in generating the current waveform.

Another object is to provide a sweep-current generating circuit which requires only two transistors.

The foregoing objects are achieved utilizing a transistor having a base-emitter resistance which decreases in response to an increasing base-emitter forward-biasing voltage and a current gain which decreases in response to an increasing collector current. To produce a linearly increasing collector current which may be supplied to a vertical deflection yoke as a sweep signal, the transistor is supplied with a progressively increasing base-emitter current, the waveform of which curves upwardly sufficiently to compensate for the decrease in current gain of the transistor. This base-emitter current is supplied by a resistor-inductor charging circuit having a resistor connected in shunt with the base-emitter path of the transistor. As the intensity of the current flowing through the charging circuit increases, the increasing forward-biasing voltage applied by the resistor between the base and emitter of the transistor reduces the resistance of its base-emitter path. As a result an increasingly large portion of the increasing charging current flows through the base-emitter path of the transistor. Hence the waveform of this portion of the charging current curves upwardly even though the waveform of the charging current curves downwardly. Because the transistor is operated in its unsaturated condition, the collector acts as a high-impedance current source. Hence the waveform of its output current, when supplied to a relatively low impedance load such as the vertical deflection yoke of a television receiver, is substantially unaffected by the electrical characteristics of the load.

Other advantages and features of the invention will become apparent from the following description taken in connection with the accompanying drawings in which FIGURE 1 is a schematic diagram of a simplified circuit used to explain the invention;

FIGURES 2 and 3 are graphs of pertinent non-linear parameters of a transistor;

FIGURE 4 is a graph relating to the operation of the circuit of FIGURE 1;

Figures 5, 6:
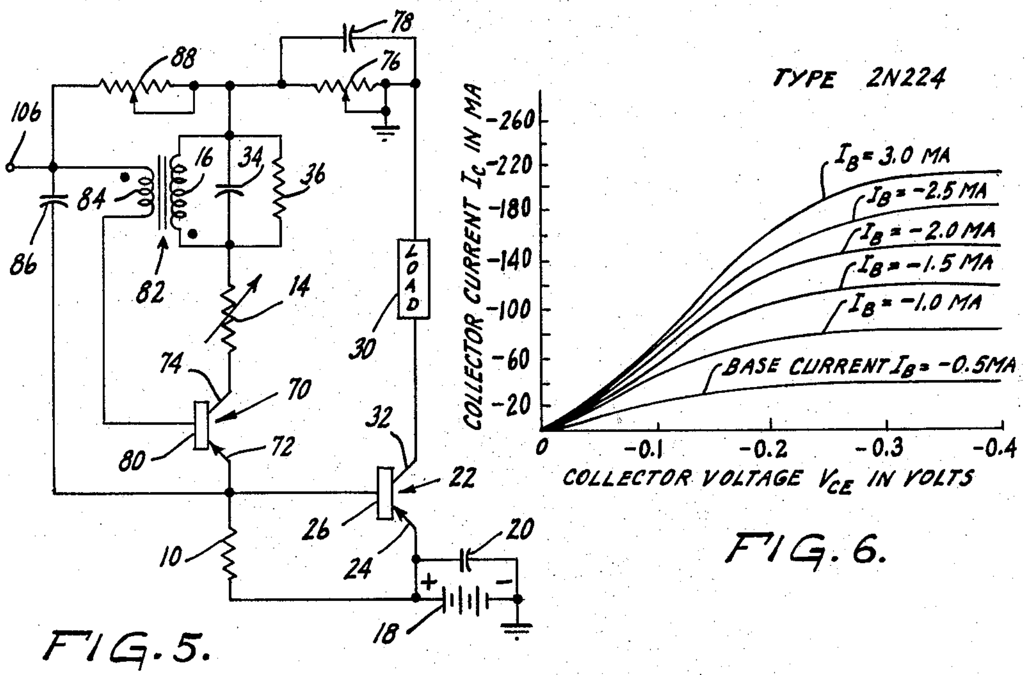
FIGURE 5 is a schematic diagram of an embodiment of the invention.
FIGURE 6 is a graph of the collector characteristics of a transistor.

Referring to FIG. 1, transistor 22, which is of the p-n-p type and connected in the common-emitter configuration, is energized by a source 18 of unidirectional current having its positive pole connected directly to emitter 24 and its negative pole connected to collector 32 by way of a direct-current-conductive load 30. Capacitor 20 bypasses battery 18. Load 30 may be the vertical deflection yoke of a television receiver.

A linearly increasing current is generated in load 30 in response to an increasing current of upwardly curving waveform flowing in the base-emitter path of transistor 22. A base-emitter current having this waveform is produced by the co-action of the base-emitter path of the transistor and a resistor-inductor charging circuit to which this path is connected. The charging circuit comprises source 18, resistor 10, switch 12, variable resistor 14 and inductor 16 connected in series relationship. Resistor 10 also is connected in shunt with the base-emitter path of transistor 22. Closure of switch 12 initiates the flow of the base-emitter current.

To limit the voltage developed by inductor 16 across switch 12 when switch 12 is opened, capacitor 34 is connected in shunt with inductor 16. To damp the oscillatory current generated in inductor 16 and capacitor 34 when switch 12 is opened, a damping resistor 36 is shunted across the capacitor and inductor.

Transistor 22 exhibits two kinds of non-linearity—a variable base-emitter resistance and a variable current gain—which affect the waveform of the current supplied to load 30. According to the invention, the variable base-emitter resistance is used to compensate for the variable current gain. FIG. 2, which is a plot of the static resistance of the base-emitter path of a Philco Type 2N386 transistor versus its forward-biasing base-emitter voltage for a constant reverse-biasing collector-emitter voltage of −2 volts, shows that the static input resistance of the transistor decreases by more than an order of magnitude as the base-emitter voltage is varied from about 0.2 volt to about 0.6 volt. FIG. 3 which is a plot of the D.-C. beta of the Type 2N386 transistor versus its collector current for a reverse-biasing collector-emitter voltage of −2 volts, shows that beta falls as the collector current rises. With switch 12 open, no substantial current flows in any branch of the circuit. When switch 12 is closed, a current I of progressively increasing intensity flows from source 18 through inductor 16. This current produces a voltage across resistor 10 which is applied in a forward-biasing polarity between base 26 and emitter 24 of transistor 22. In response to this voltage the base-emitter path of the transistor becomes conductive. Thereafter the current I from source 18 flows in part through resistor 10 as a current component $I_1$ and in part through the base-emitter path of transistor 22 as a current component $I_2$. As the intensity of current I increases, the intensity of component $I_1$ also increases. Hence the forward-biasing voltage applied between base 26 and emitter 24 rises. As a result the base-emitter resistance of transistor 22 falls (see FIG. 2). Since the value of resistor 10 remains constant, the ratio $I_2/I_1$ increases. Consequently the waveform of the current component $I_2$ flowing through the base-emitter path of transistor 22 curves upwardly (see curve 60, FIG. 4) even though the waveform of the total current I curves downwardly (see curve 58, FIG. 4). Curve 62 (FIG. 4) shows the waveform of the current component $I_1$ flowing in resistor 10. The amount of curvature of the waveform of component $I_2$ can be adjusted by appropriate adjustment of the values of resistor 10 or resistor 14 or both.

Were transistor 22 a device having a constant beta over its entire range of collector current, a current having a waveform identical to that shown at 60 would flow through collector 32 and be supplied to load 30. Such an upwardly curving waveform would not necessarily be a desirable sweep waveform since it would cause the beam of the cathode ray tube to be deflected with inconstant velocity across the screen. However, as discussed hereinbefore, the beta of the transistor decreases as its collector current increases. Since the intensity of the collector current flowing in transistor 22 is the product of its base current $I_2$ and the value of its beta, the waveform of this collector current may be made linear by appropriately shaping the upward curvature of the base current $I_2$ to compensate for the downward curvature of the beta characteristic. This linear collector current waveform is shown in FIG. 4 at 64. Transistor 22 is operatad under unsaturated conditions. Therefore its collector 32 is a high-impedance current source. The collector current flows through load 30 without substantial change in its waveform. When switch 12 is opened, the current in inductor 16 rapidly decreases in well-known manner. This decrease is represented in FIG. 4 by line 66.

FIG. 5 shows an astable waveform generating circuit according to the invention. In addition to the components of the simplified circuit of FIG. 1, the circuit of FIG. 5 comprises both a feedback network for causing a repetitive current waveform to be generated at a given frequency and means for controlling the maximum intensity of the current waveform generated in load 30. A transistor 70 is used as the switch 12.

More particularly transistor 70, like transistor 22, is of the p-n-p type. Emitter 72 of transistor 70 is connected to resistor 10, and collector 74 thereof is connected to resistor 14. To control the maximum voltage supplied to the series charging circuit including resistor 10, the emitter-collector path of transistor 70, resistor 14 and inductor 16, a variable resistor 76 is connected between inductor 16 and a point at reference potential. A capacitor 78 is connected across resistor 76 to by-pass alternating currents.

To permit a feedback signal to be derived therefrom, inductor 16 is made the primary winding of a phase-reversisng transformer 82 having a secondary winding 84. To apply the feedback signal between emitter 72 and base 80 of transistor 70, one terminal of secondary winding 84 is connected directly to base 80 and the other terminal thereof is connected by way of a capacitor 86 to emitter 72. To supply D.-C. base current to base 80 and control the repetition rate of the circuit, a variable resistor 88 is connected in series relationship with variable resistor 76 and secondary winding 84.

The operation of the circuit of FIG. 5 is as follows. When switching transistor 70 is driven into a collector-current saturation condition by applying a forward-biasing voltage between base 80 and emitter 72, as described hereinafter, a current of progressively increasing intensity flows from source 18 through the parallel combination of resistor 10 and the base-emitter path of output transistor 22, and thence through the emitter-collector path of switching transistor 70, resistor 14 and inductor 16. This current produces the desired linearly increasing current through load 30 in the manner already described in connection with the embodiment of FIG. 1. In addition the increasing current flowing through inductor 16 induces a voltage across secondary winding 84 in a polarity such as to forward-bias the base-emitter path of transistor 70. This voltage is sufficiently high to maintain transistor 70 in saturation. As a result the impedance of the emitter-collector path of transistor 70 remains very low and the current supplied by source 18 continues to increase. This increase ends when the collector current of switching transistor 70 is sufficiently large with respect to its base current that transistor 70 can no longer operate under saturation conditions. FIG. 6, comprising plots of collector current versus collector voltage for various constant base currents for a Philco Type 2N224 transistor connected in the common-emitter configuration, shows that for each base current there is a first range of collector voltages for which the collector current rises as the collector voltage rises (the region of saturated operation), and a second range of collector voltages for which the collector current remains substantially constant even though the collector voltage rises (the region of unsaturated operation).

In the circuit of FIG. 5, the collector current of transistor 70 rises to the maximum value which transistor 70 can supply in view of its base current, in a time determined by the rate of increase of current through inductor 16. Then the current supplied by collector 74 to inductor 16 becomes substantially constant. This constant current induces no voltage across secondary winding 84; as a result the base current supplied to switching transistor 70 decreases. In response to this decrease, the collector current supplied by transistor 70 to inductor 16 decreases. This decreasing current induces across secondary winding 84 a reverse-biasing voltage which cuts off switching transistor 70.

Because switching transistor 70 is cut off, its emitter-collector path has a very high impedance. Because magnetic energy is stored in inductor 16, an oscillatory current tends to flow between inductor 16 and capacitor 34. Resistor 36 damps this oscillation. Initially a reverse-biasing voltage is induced across secondary winding 84 by the current flowing in inductor 16. Thereafter, at a time determined in well-known manner by the values of inductor 16, capacitor 34 and resistor 36, the voltage induced across winding 84 reverses polarity. That is, a forward-biasing voltage of progressively increasing value appears across winding 84. This voltage rapidly drives switching transistor 70 into saturation. As a result, the impedance of the emitter-collector path of transistor 70 falls and damps out further current oscillations in inductor 16 and capacitor 34. At this point in time, the circuit of FIG. 5 has completed one full cycle of operation, and a new cycle begins.

Resistor 88 controls the rate at which the foregoing repetitive cycle occurs by controlling the base current flowing into switching transistor 70. By controlling this base current, resistor 88 determines the value of collector current for which switching transistor 70 ceases to operate under saturation conditions and initiates the flyback portion of the repetitive cycle.

Resistor 76 controls the total voltage applied across the series circuit comprising inductor 16, resistor 14, the emitter-collector path of transistor 70, and the parallel combination of resistor 10 and the base-emitter path of transistor 22. Hence it controls the maximum intensity of the current flowing through inductor 16 as well as its rate of change. However, variation of resistor 76 does not change substantially the repetition rate of the circuit. More particularly, as the value of resistor 76 is decreased, a larger voltage is applied across the above-described series circuit. This larger voltage causes the current flowing through the series circuit to increase more rapidly. This increase in rate tends to increase the repetition rate of the system of FIG. 5 by causing transistor 70 to come out of saturation more rapidly. However, decreasing the resistance of resistor 76 also increases the base current supplied to transistor 70. Hence the collector current at which transistor 70 comes out of saturation also rises and additional time is required for the collector current to attain this new higher maximum value.

As aforementioned, the circuit of FIG. 5 may be used in a television receiver as a sweep oscillator and sweep output circuit, e.g. as the vertical oscillator and output stage thereof. In such an application, load 30 is the vertical deflection yoke of the receiver. The circuit is held in synchronism by supplying vertical synchronizing pulses of positive polarity to base 80 via terminal 106 and winding 84, and the value of resistor 88 is adjusted so that the circuit has a natural repetition rate slightly lower than the repetition rate of the vertical synchronizing pulses. When a vertical sync pulse is applied to base 80, it reduces the base current of transistor 70 to a value such that transistor 70 no longer operates under saturation conditions. Hence the pulse initiates the flyback portion of the repetitive cycle. The duration of the flyback portion is controlled by the values of inductor 16, capacitor 34 and resistor 36.

Figure 7:
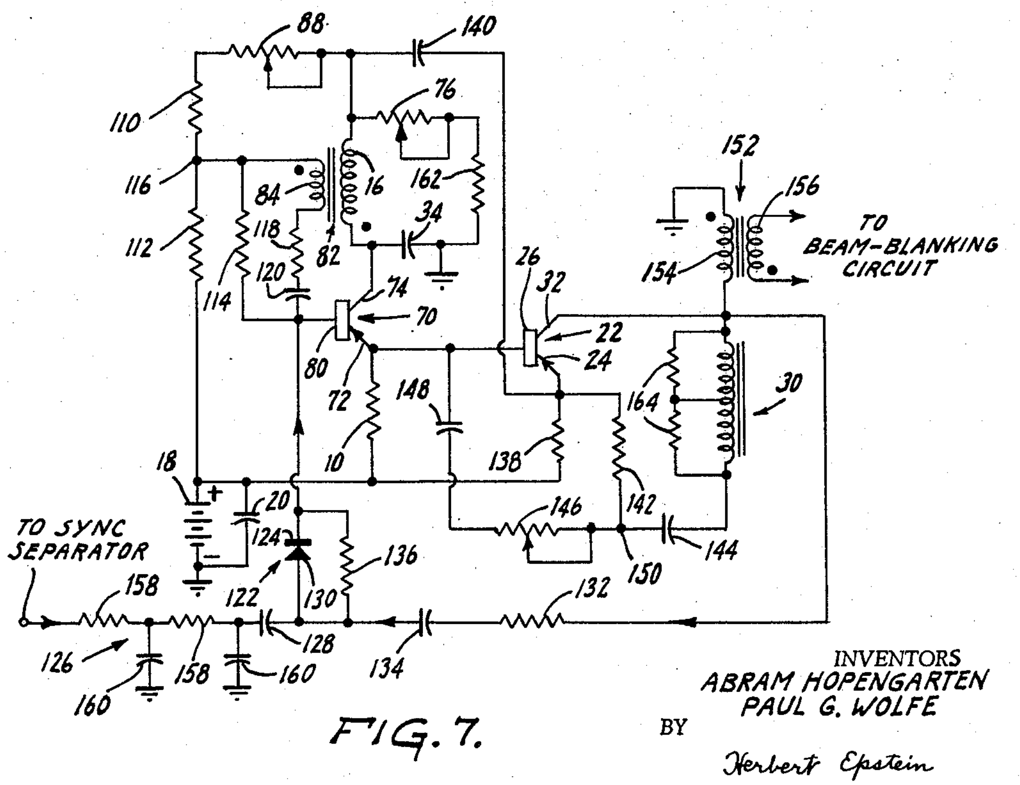
FIGURE 7 is a schematic diagram of another embodiment of the invention.

FIG. 7 shows a vertical sweep generating circuit similar to that of FIG. 5 but incorporating features not found in the circuit of FIG. 5. Only those portions of FIG. 7 which differ from FIG. 5 will be described. In this circuit base bias is supplied to transistor 70 from a low-impedance source comprising resistors 110 and 112, thereby to enhance the temperature stability of the circuit. Resistors 110 and 112 are connected between variable resistor 88 and the positive terminal of source 18. A resistor 114 connects the junction 116 of resistors 110 and 112 to base 80. One terminal of secondary winding 84 also is connected to junction 116. Another resistor 118 couples the other terminal of winding 84 to base 80 via a blocking capacitor 120. Resistors 114 and 118 and capacitor 120 constitute a differentiating network which sharpens the pulses supplied to base 80 by secondary winding 84. Such sharpening increases the frequency stability of the circuit.

To inhibit spurious triggering by noise pulses, a sync-pulse gate comprising diode 122 is provided. Base 80 of switching transistor 70 is connected to cathode 124 of diode 122. A resistor-capacitor integrating network 126 is coupled by a blocking capacitor 128 to the anode 130 of diode 122. Network 126 integrates the separated sync pulses supplied thereto, thereby deriving in conventional manner the vertical sync pulses. It supplies these pulses to anode 130 via capacitor 128. In addition a resistor 132 and a capacitor 134, serially connected between the collector 32 of output transistor 22 and anode 130 of diode 122, supply a positive-going replica of the sweep voltage to anode 130 as a gating voltage. A resistor 136 of high value provides a discharge path for capacitors 128 and 134.

During the interval between the trailing edge of one sync pulse and a time slightly before the leading edge of the next sync pulse, diode 122 is reverse-biased by supplying a positive potential to its cathode 124 via resistor 114 and supplying a potential negative with respect to cathode potential to its anode 130. The negative potential is supplied by capacitor 134 which is charged by the gating voltage during times when diode 122 is forward biased. Hence during said interval, diode 122 has a high impedance and effectively prevents transmission to base 80 of noise pulses appearing at anode 130. However, during said interval the sawtooth gating voltage supplied to anode 130 becomes progressively more positive, and at a time slightly before the next sync pulse this gating voltage is sufficiently positive to forward-bias diode 122. Under these conditions, diode 122 applies the next sync pulse to base 80 without substantial attenuation and triggers the circuit into its flyback condition in the manner discussed in connection with FIG. 5. To stabilize the operation of the output transistor 22, a low-valued resistor 138 is connected in series with its emitter 26.

To permit more precise shaping of the waveform of the current supplied by collector 32 to yoke 30, a negative feedback network is provided. This network comprises a resistor 142 and a capacitor 144 connected serially between deflection yoke 30 and emitter 24. It also comprises a variable resistor 146 and a capacitor 148 connected serially between base 26 and the junction 150 of capacitor 144 and resistor 142. In operation, the feedback voltage is developed across resistor 142 by the flow of deflection current therethrough. In response to this voltage a feedback current is supplied to base 26 of transistor 22. The intensity and waveshape of this current depends in well-known manner on the respective values of resistor 146 and capacitor 148. The current has a sense such as to subtract from the current supplied to base 26 by transistor 70.

A transformer 152 having a primary winding 154 and a secondary winding 156 is provided to derive a signal for cutting off the cathode-ray beam of the picture tube during the retrace period. Primary winding 154 is connected between collector 32 and the point at reference potential and provides a D.-C. return for collector 32. Secondary winding 156 is connected to circuitry of conventional form which in response to each flyback pulse supplied thereto by transformer 154, develops and applies to the cathode of the picture tube a positive pulse of voltage which cuts off the beam of the picture tube during the flyback period.

The operation of the circuit of FIG. 7 is substantially the same as that of FIG. 5 except in the respects already noted. Accordingly no further discussion thereof is deemed necessary.

Typical values for the components of the circuit of FIG. 7 are as follows:

| | |
|---|---|
| Transistor 22 | Type 2N1073. |
| Transistor 70 | Type 2N224. |
| Resistor 10 | 47 ohms. |
| Resistor 76 | 3 kilohms. |
| Resistor 88 | 2 kilohms. |
| Resistor 110 | 470 ohms. |
| Resistor 112 | 1.8 kilohms. |
| Resistor 114 | 2.2 kilohms. |
| Resistor 118 | 1 kilohm. |
| Resistor 132 | 100 kilohms. |
| Resistor 136 | 3.3 megohms. |
| Resistor 138 | 1 ohm. |
| Resistor 142 | do. |
| Resistor 146 | 250 ohms. |
| Resistors 158 | 1.8 kilohms each. |

| | |
|---|---|
| Resistor 162 ______ | 1 kilohm. |
| Resistors 164 _____ | 1 kilohm each. |
| Capacitor 20 ______ | 2000 microfarads. |
| Capacitor 34 ______ | 0.068 microfarad. |
| Capacitor 120 _____ | 0.047 microfarad. |
| Capacitor 128 _____ | 0.1 microfarad. |
| Capacitor 134 _____ | do. |
| Capacitor 140 _____ | 250 microfarads. |
| Capacitor 144 _____ | 500 microfarads. |
| Capacitor 148 _____ | 100 microfarads. |
| Capacitors 160 ____ | 0.068 microfarad each. |
| Transformer 82 ___ | Winding 16 has an inductance of of about 1 henry with 5 milliamperes D.-C. flowing therethrough. The primary-to-secondary turns ratio is 8.45:1.41. |
| Transformer 152 __ | Primary winding 154 had an inductance of about 0.6 henry. |
| Source 18 ________ | 18 volts. |

The foregoing values are only exemplary and the invention is not limited thereto.

In the embodiments discussed above, the transistors are all of the p-n-p type. However, transistors of the n-p-n type may be substituted therefor. When this is done, the respective polarities of the supply voltage and synchronizing pulses are reversed. In addition, in the arrangement of FIG. 7, the poling of diode 122 is reversed.

While, in the foregoing embodiments, component 10 has been shown as a resistor, direct-current-conductive elements having reactive characteristics can be used in place of or in combination with resistor 10 to achieve output current waveforms not obtainable where the current division between element 10 and the base-emitter path of transistor 22 is determined solely by their relative resistances. Similarly inductor 16 can be replaced by other reactive elements.

While various specific embodiments of the invention have been illustrated and described, it is to be understood that the invention is not limited thereto but contemplates such modifications and further embodiments as may occur to those skilled in the art.

What we claim is:

1. A waveform generator comprising: a transistor having an emitter, a collector and a base, the base-emitter path of said transistor having a resistance which changes in response to a changing forward-biasing voltage applied between said emitter and said base and a current gain which changes in response to a change in the collector current of said transistor, a direct-current-conductive impedance element, means connecting said impedace element between said emitter and said base, a reactive element, a switch and means for supplying a unidirectional voltage, means connecting said impedance element, said switch, said reactive element, and said voltage-supplying means in series relationship, and a load coupled to the emitter-collector path of said transistor, said unidirectional voltage having such polarity as to supply to said impedance element, upon closure of said switch, a first current portion sensed to develop across said impedance element a voltage which forward-biases said base-emitter path of said transistor, thereby enabling a second current portion to flow from said voltage-supplying means through said base-emitter path of said transistor, said unidirectional voltage having a value sufficiently high that said forward-biasing voltage can change by an amount producing substantial changes respectively in said resistance of said base-emitter path, said collector current and said current gain of said transistor, said impedance element having an impedance value such that a substantial change in said resistance of said base-emitter path when forward biased causes a substantial change in the ratio of the respective intensities of said first and said second current portions, and means for closing said switch for a time sufficiently long for said forward-biasing voltage to change in value by an amount producing said respective substantial changes in said resistance of said base-emitter path, said collector current and said current gain of said transistor.

2. A waveform generator according to claim 1 wherein said direct-current-conductive impedance element is a resistive element.

3. A waveform generator according to claim 1, wherein said base-emitter path of said transistor has a resistance which decreases in response to an increasing forward-biasing voltage applied between said emitter and said base, said direct-current-conductive impedance element is a resistive element and said reactive element is an inductive element.

4. A waveform generator according to claim 1, wherein said load is connected in series relationship with said collector.

5. A waveform generator according to claim 1, wherein said switch comprises semiconductor switching means.

6. A waveform generator comprising: a first transistor having an emitter, a collector and a base, the base-emitter path of said transistor having a resistance which changes in response to a changing forward-biasing voltage applied between said emitter and said base and a current gain which changes in response to a change in the collector current of said transistor; a direct-current-conductive impedance element; means connecting said impedance element between said emitter and said base; a reactive element; a switch comprising a second transistor having an emitter, a collector and a base; means for supplying a unidirectional voltage; means connecting said impedance element, the emitter-collector path of said second transistor, said reactive element and said voltage-supplying means in series relationship; and a load coupled to the emitter-collector path of said first transistor; said unidirectional voltage having such polarity as to supply to said impedance element, upon closure of said switch, a first current portion sensed to develop across said impedance element a voltage which forward-biases said base-emitter path of said first transistor, thereby enabling a second current portion to flow from said voltage-supplying means through said base-emitter path of said first transistor, said unidirectional voltage having a value sufficiently high that said forward-biasing voltage can change by an amount producing substantial changes respectively in said resistance of said base-emitter path, said collector current and said current gain of said first transistor, said impedance element having an impedance value such that a substantial change in said resistance of said base-emitter path of said first transistor causes a substantial change in the ratio of the respective intensities of said first and said second current portions, and means for closing said switch for a time sufficiently long for said forward-biasing voltage to change in value by an amount producing said respective substantial changes in said resistance of said base-emitter path, said collector current and said current gain of said first transistor.

7. A waveform generator according to claim 6, wherein said base-emitter path of said first transistor has a resistance which decreases in response to an increasing forward-biasing voltage applied between said emitter and said base of said first transistor and a current gain which decreases in response to an increase in said collector current of said first transistors, said direct-current-conductive impedance element is a resistive element, and said reactive element is an inductive element.

8. A waveform generator according to claim 7, wherein said means for closing said switch comprise means for supplying to said base of said second transistor a switching potential which forward-biases the base-emitter path of said second transistor during periodically recurring times of at least said sufficient length and reverse-biases said base-emitter path of said second transistor during the times between successive ones of said periodically recurring times.

9. A waveform generator according to claim 7, wherein said inductive element has an inductance sufficiently small compared to the resistance of the parallel combination of said resistive element and said base-emitter path of said first transistor that the waveform of the current passing through said inductive element when said switch is closed is substantially curved.

References Cited by the Examiner

UNITED STATES PATENTS

| | | | |
|---|---|---|---|
| 2,934,657 | 4/60 | Rack | 307—88.5 |
| 2,939,040 | 5/60 | Isabeau | 307—88.5 X |
| 3,089,964 | 5/63 | Bruce et al. | 307—88.5 |

JOHN W. HUCKERT, *Primary Examiner.*